(12) United States Patent
Samios (10) Patent No.: US 8,639,278 B1
(45) Date of Patent: Jan. 28, 2014

(54) SYSTEMS AND METHODS FOR CONNECTING RADIO SYSTEMS

(75) Inventor: Christopher Samios, Garner, NC (US)

(73) Assignee: Raytheon Company, Waltham, MA (US)

( * ) Notice: Subject to any disclaimer, the term of this patent is extended or adjusted under 35 U.S.C. 154(b) by 269 days.

(21) Appl. No.: 13/158,407

(22) Filed: Jun. 11, 2011

(51) Int. Cl.
*H04B 7/00* (2006.01)
*H04W 24/00* (2009.01)

(52) U.S. Cl.
USPC ...... 455/518; 455/517; 455/422.1; 455/432.3

(58) Field of Classification Search
USPC ........ 455/519, 518, 422.1, 520, 426.1, 432.1, 455/432.2, 436, 445, 446, 512, 432.3, 517, 455/448; 370/327, 341, 350
See application file for complete search history.

(56) References Cited

U.S. PATENT DOCUMENTS 6,529,486 B1 * 3/2003 Barnes et al. ................. 370/327
6,584,324 B1 * 6/2003 Vivekanandan .............. 455/519

* cited by examiner

*Primary Examiner* — John J Lee
(74) *Attorney, Agent, or Firm* — Lando & Anastasi, LLP (57) ABSTRACT

A system and method of connecting a first radio system and a second radio system are disclosed. In one example, the method includes receiving audio data and identification data from a first user radio in a first radio talkgroup of the first radio system, transferring the audio data and the identification data to a connect unit, selecting a second talkgroup in the second radio system based on a predetermined talkgroup mapping, transferring the audio data and the identification data from the connect unit to the second radio system, and transmitting the audio data and the identification data to a second user radio in the second talkgroup of the second radio system.

17 Claims, 4 Drawing Sheets

SYSTEMS AND METHODS FOR CONNECTING RADIO SYSTEMS

BACKGROUND

Wireless radio communication systems are used by a wide variety of user groups, such as public safety agents, for example, fire and police departments, and emergency medical services, to communicate information among personnel. There are several different radio systems using different protocols for radio communications. Some example radio systems include Project 25 (P25) radio systems, where P25 is a suite of standards for digital radio communications, Project 16 (P16) radio systems, where P16 is a suite of standards for digital radio communications, and SmartNet™ or SmartZone™ radio systems available from Motorola, Inc. (Schaumburg, Ill.), which allow for multi-site wide area communications. Different radio systems may be installed in different yet nearby geographical locations. For example, one metropolitan area or municipality may install one type of radio system and an adjacent or nearby municipality may have installed a different type of system. Interoperability between different radio systems is limited, and presently only audio signals can be communicated from one radio system to another.

SUMMARY

Aspects and embodiments are directed to methods and apparatus of providing a "bridge" between two or more disparate radio systems such that important user data, in addition to audio, can be passed from one radio system to the other as users roam between the physical locations of each system. In addition, aspects and embodiments are directed to methods and apparatus for mapping multiple talkgroups within a pair of cross-connected radio components to reduce the number of radio components needed to cover a large number of talkgroups, as discussed further below.

According to one aspect, a method is provided for connecting a first radio system and a second radio system. The method includes receiving at a first radio component in the first radio system audio data and identification data from a first user radio in a first talkgroup of the first radio system, transferring the audio data and the identification data from the first radio component to a connect unit, selecting a second talkgroup in the second radio system based on a predetermined talkgroup mapping, transferring the audio data and the identification data from the connect unit to a second radio component in the second radio system, and transmitting the audio data and the identification data to a second user radio in the second talkgroup of the second radio system. According to one example, the identification data may include one or more of a user identification, a talkgroup identifier, an emergency indicator and a man-down indicator.

In one embodiment, the first radio system uses a first radio transmission protocol and the second radio system uses a second radio transmission protocol. The method may further include translating the audio data and the identification data from the first radio protocol to the second radio protocol at the connect unit. According to another embodiment, the first talkgroup may have a priority rating in the first radio system, and the method may further include transferring the priority rating from the first radio system to the second radio system at the connect unit. In another embodiment, the method may further include holding the audio data in a buffer for a selected period of time.

According to another aspect, a bridge system is provided, the bridge system configured to connect a first radio system and a second radio system. The bridge system includes a first radio component in the first radio system, a connect unit, and a second radio component in the second radio system. The first radio component is configured to receive audio data and identification data from a plurality of first user radios in a plurality of first talkgroups in the first radio system. The connect unit is configured to receive the audio data and the identification data from the first radio component, identify the first talkgroup, select at least one second talkgroup in the second radio system based on a predetermined talkgroup mapping, and transfer the audio data and the identification data to the second radio system. The second radio component in the second radio system is configured to receive the audio data and the identification data and transmit the audio data and the identification data to a plurality of second user radios in the at least one second talkgroup. In one embodiment, the identification data includes at least one of a user identification, a talkgroup identifier, an emergency indicator and a man-down indicator.

According to one embodiment, the first radio system uses a first radio protocol and the second radio system uses a second radio protocol. In one example, the connect unit is further configured to translate the audio data and the identification data from the first radio protocol to the second radio protocol. In another example, each of the plurality of first talkgroups have a priority rating and the connect unit is configured to receive the priority ratings and transfer the priority ratings from the first radio system to the second radio system. In another embodiment, the connect unit is further configured to hold the audio data in a buffer for a selected period of time. In a further embodiment, the at least one second talkgroup includes a plurality of second talkgroups, and the predetermined mapping includes a mapping of the plurality of first talkgroups to a plurality of second talkgroups.

According to another aspect, a method of connecting a user radio from a first radio system to a second radio system is provided. The method includes receiving audio data and identification data from the user radio, translating the audio data and the identification data from a first protocol used by the first radio system to a second protocol used by the second radio system, transferring the audio data and the identification data to a radio component in the second radio system, and transmitting from the radio component the audio data and the identification data. In one embodiment, the identification data includes at least one of a user identification, a talkgroup identifier, an emergency indicator and a man-down indicator.

According to one embodiment, receiving the audio data and the identification data includes receiving the audio data and the identification data from a first talkgroup, and transferring the audio data and the identification data includes transferring the audio data and the identification data to a corresponding second talkgroup in the second radio system. In one example, the method further includes selecting the second talkgroup based on a predetermined mapping that maps the first talkgroup to the second talkgroup. In another example, the method further includes holding the audio data in a buffer for a selected period of time.

Still other aspects, embodiments, and advantages of these exemplary aspects and embodiments, are discussed in detail below. Any embodiment disclosed herein may be combined with any other embodiment in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

As discussed above, limited interoperability between disparate radio systems using different protocols can be achieved using connect units configured to pass audio from one radio system to another. The connect units use radio frequency (RF) links to connect user radios from two or more different radio systems. User radios within any of a variety of digital radio systems, including, for example, the P25 system and systems available from Motorola discussed above, embed useful digital information within each transmission, such as, for example, the user radio's identifier and the number of the talkgroup being used. Although this information is available to user radios within a given network, existing radio systems and connect units are not able to transfer such digital data from one system to another. For example, the identifiers of user radios in one radio system are not visible to user radios in the other radio system(s). For a user group on one type of radio system to fully communicate with a user group using another type of radio system, the existing solution is for one of the user groups to upgrade their entire radio system. Upgrading an entire radio system is costly and complicated.

Thus, there is a need for a low-cost and easily-installable mechanism for transferring both audio and digital data between different radio systems to allow for more complete interoperability between the radio systems. Accordingly, aspects and embodiments are directed to a system and method that configures a connect unit to transfer digital data in addition to audio signals from user radios in one radio system to user radios in another, different radio system, as discussed further below. The digital data may include user radio identification data, emergency call information, "man-down" alerts, talkgroup information, or other data. Additionally, embodiments employ a scanning method that limits the number of RF devices used to accomplish the interoperability between systems, as discussed further below. These approaches allow existing radio systems to be modified relatively inexpensively to enable full digital and audio communication with other radio systems operating under a different protocol. Furthermore, with this capability, user groups (such as municipalities or cities) may be able to transition more easily from one type of radio system to another, for example, to upgrade to a P25 system, because users may be able to access both radio systems (and other users in both systems) throughout the transition.

Embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
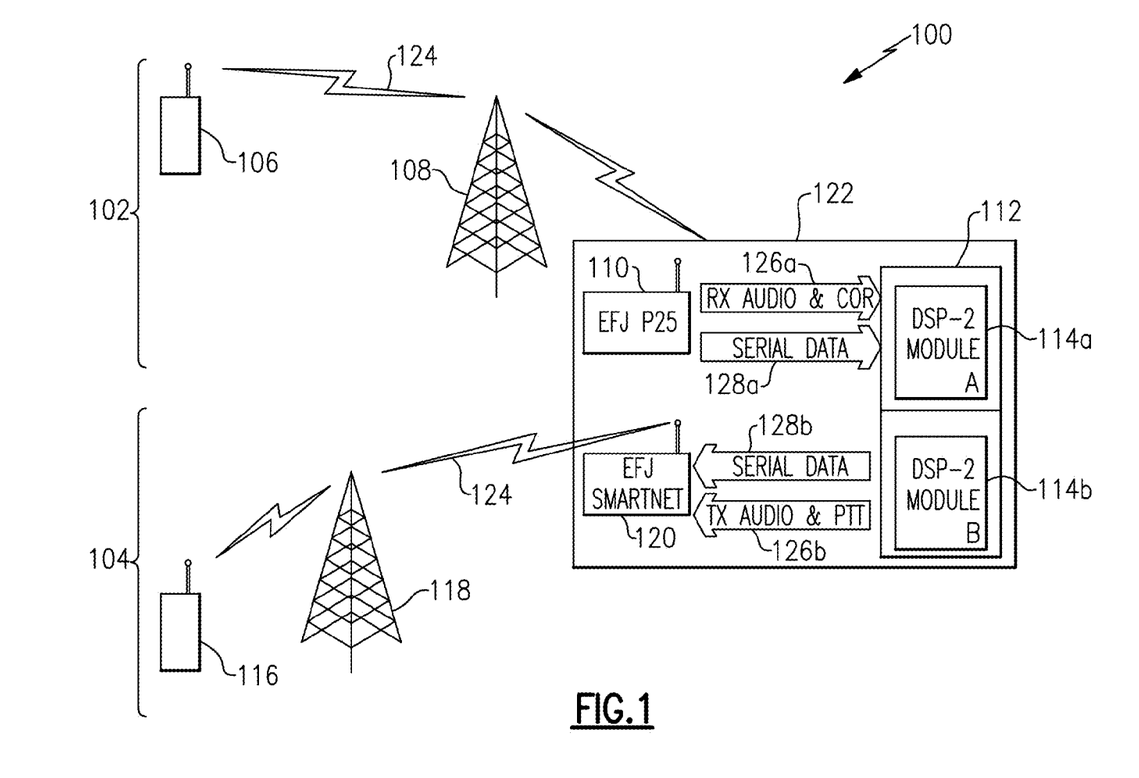
FIG. 1 is a schematic diagram of one example of a system for connecting two radio systems according to aspects of the invention.

Referring to FIG. 1, there is illustrated a schematic diagram of one example of a bridging system that interconnects a first radio system 102 and a second radio system 104 each operating under a different radio protocol. For example, the first radio system 102 may use a P25 protocol while the second radio system 104 uses a Motorola Smartzone™ protocol. The first radio system includes one or more user radios 106, and the second radio system includes one or more user radios 116. A radio bridge control station 122 includes two or more radio control stations, also referred to herein as "radio components" and a connect unit 112 that bridges the two radio systems 102, 104 using RF links 124. The radio bridge control station 122 includes a first radio component 110 that is compatible with the protocol of the first radio system 102, and a second radio component 120 compatible with the protocol of the second radio system 104. The first and second radio components 110, 120 are coupled to the connect unit 112. In one example, the first and second radio components 110, 120 are connected by data cables to the connect unit 112. It is to be appreciated that although FIG. 1 illustrates two radio systems 102, 104, and although the following discussion may primarily discuss bridging two disparate radio systems, embodiments of the method and apparatus discussed herein are not limited to bridging two radio systems, and may be configured using the principles discussed herein to bridge three or more radio systems.

In the example illustrated in FIG. 1, the user radios 106, 116 communicate with the radio components 110, 120 of the radio bridge control station 122 using system repeaters 108 (in the first radio system 102) and 118 (in the second radio system 104). In this example, the radio components 110, 120 act in the same manner as any user radios 106, 116. However, in other examples the user radios 106, 116 may communicate directly with the radio components 110, 120, respectively.

As discussed above, the user radios 106, 116 embed digital information within their transmissions, including identification information, such as a user ID, of the user radio. Thus, according to one embodiment, the first radio component 110 receives both audio data and identification data from the first user radio 106 and transmits the audio data 126a and the identification data 128a to the connect unit 112. The connect unit 112 reformats and transfers the audio data 126b and the identification data 128b to the second radio component 120, and the second radio component 120 transmits the audio data and the identification data, thus identifying the initial caller (i.e., the first user radio). The second user radio 116 receives the transmitted audio data and identification data, and therefore knows the origination of the audio data. This ability is particularly beneficial when the audio relates to an emergency call or contains other critical information. By contrast, in existing systems, although the audio from the first user radio 106 may be passed through to the second radio system, the identification data is not. Instead, the identification data that is transmitted with the audio from the first user radio 106 is that of the second radio component 120.

According to one embodiment, the connect unit 112 includes first 114a and second 114b digital signal processing (DSP) modules. The first DSP module 114a receives and processes the audio data and identification data from the first radio component 110, and transfers the processed audio data and identification data to the second DSP module 114b. The second DSP module 114b processes the audio data and identification data from the first DSP module 114a and transfers the processed audio data and identification data to the second radio component 120. The DSP modules 114a and 114b are also configured to operate similarly in the reverse direction. Thus, the DSP modules 114a, 114b cross-connect the first and second radio components 110, 120. The second radio component 120 is configured to allow transmission in the second radio system 104 of a user ID that correlates to the first user radio 106 in the cross-connected first radio system 102. Similarly, the first radio component 120 is configured to allow transmission in the first radio system 104 of a user ID that correlates to the second user radio 106 in the cross-connected second radio system 102.

According to one embodiment, the digital signal processors 114a, 114b of the connect unit 112 store the received audio data in a buffer before transmitting it to the second radio system 104. In one example, the connect unit 112 stores the received audio data in a buffer while the connect unit translates the transmission to the second transmission protocol. In another example, the connect unit 112 stores the received audio data in a buffer while the connect unit 112 translates the identification data for transmission to the second radio system 104.

As discussed above, the transmissions from the user radios may also include embedded information that identifies the talkgroup being used. Radio systems may grow large as many agencies or user groups share a single radio system. For example, the police department, the fire department, the emergency medical response department and the public works department of a given municipality may all share a radio system. To accommodate many different users, many radio systems have separate talkgroups for different departments or dedicated to different purposes. In a trunked radio system, a talkgroup is the term given to assigned user groups. The talkgroups share the allocated frequencies in the trunked systems so as to increase system bandwidth. The user of a user radio may select the talkgroup on which the user radio transmits data. For example, the police department may use one talkgroup to report a traffic violation and a different talkgroup to report an emergency.

According to one embodiment, a bridging system allows the talkgroup(s) of the first radio system 102 to be mapped to corresponding talkgroup(s) of the second radio system 104 to create interoperable talkgroups. An interoperable talkgroup includes user radios from the first talkgroup of the first radio system 102 and from the second talkgroup of the second radio system 104. To create this interoperability, the receiving cross-connected radio component passes on the talkgroup on the incoming transmission, and the transmitting cross-connected radio component then retransmits the transmission to the correct (preconfigured) talkgroup in its radio system. For example, the first radio component 110 in the first radio system 102 may receive a call in the first talkgroup and the first radio component transfers the talkgroup information to the connect unit 112. The connect unit 112 identifies the first talkgroup and transfers the corresponding second radio system talkgroup information to the second radio component 120, based on a preprogrammed mapping of the talkgroups between the first and second radio systems. The second radio component transmits the call to the second talkgroup in the second radio system 104. In this manner, the connect unit 112 and radio components 110, 120 create seamless interoperability among the talkgroups of disparate radio systems. In one example, the talkgroup information includes a priority rating and the connect unit 112 transfers the priority rating from the first radio system to the second radio system.

The connect unit 112 includes DSP modules 114a and 114b. According to a variety of examples, the DSP modules 114a and 114b are implemented as one or more hardware and/or software components. In some examples, the DSP modules 114a and 114b be implemented using one or more commercially available processors, such as processors manufactured by Texas Instruments, Intel, AMD, Sun, IBM, Motorola, Freescale and ARM Holdings. However, the DSP modules 114a and 114b may include any type of processor, field-programmable gate array, multiprocessor or controller, whether commercially available or specially manufactured, that is programmed to perform the signal processing and computations discussed below.

Figure 2:
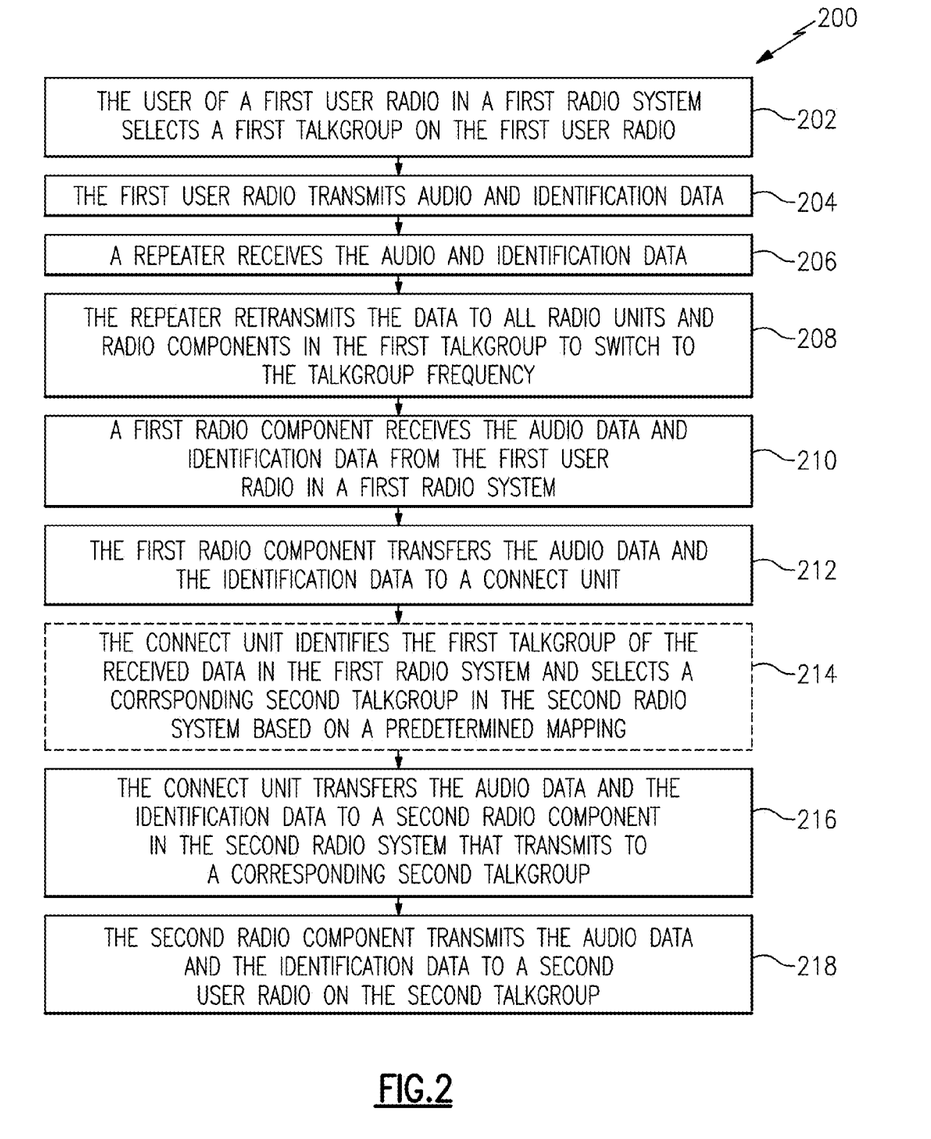
FIG. 2 is a flow chart of one example of a method of bridging two radio systems according to aspects of the invention.

Referring to FIG. 2, there is illustrated a flow chart of an example of a method 200 of bridging two radio systems according to one embodiment. In a first step 202, the user of a first user radio 106 in the first radio system 102 selects a first talkgroup on the first user radio 106. According to one example, the user may select the talkgroup corresponding to the type of call the user is going to make (e.g., an emergency call or an incident report). The user makes the call, and in step 204, the first user radio 106 transmits the audio data of the call along with embedded identification data. In one example, the identification data includes data that identifies the first user radio as the user radio transmitting the call and the talkgroup being used. According to one embodiment, the identification data transmitted by the first user radio 106 may also include emergency information, such as a "man-down" alert, for example.

In one embodiment, at step 206, the repeater 108 receives the audio and identification data transmitted by the first user radio 106. At step 208, the repeater 108 retransmits the audio and identification data to user radios and radio components in the first talkgroup. At step 210, the first user radio component 110 in the radio bridge control station 122 receives the audio data and identification data from the first radio system 102. At step 212, the first radio component 110 transfers the audio data and the identification data to the connect unit 112. At step 214, the connect unit 112 identifies the talkgroup of the transmission. According to one embodiment, the connect unit 112 uses a predetermined talkgroup mapping to select the corresponding talkgroup in the second radio system 104, referred to as the second talkgroup. In one example, a first police department's talkgroup for reporting traffic violations is connected to a second police department's corresponding traffic violation talkgroup, allowing the two police departments to work together. In another example, the emergency response talkgroup of one municipality is connected to the emergency response talkgroup of a second municipality, allowing the emergency response departments of the two municipalities to provide additional emergency support to each other.

Still referring to FIG. 2, in one example, at step 216, the connect unit 112 transfers the audio data and the identification data to the second radio system 104 by transferring the data to the second radio component 120 that transmits to the corresponding second talkgroup in the second radio system. In one example, the first radio system 102 sends a COR (carrier operated relay) signal indication, indicating that the connected radio(s) is receiving a transmission, and the radio bridge control station 122 creates a PTT (push to talk) signal to the second radio control system 104 so that the second radio system can transmit the audio and data it receives from the connect unit 112. In one example, the first radio system uses a first radio protocol and the second radio system uses a second radio protocol, and the connect unit 112 translates the audio data and the identification data from the first radio protocol to the second radio protocol. For example, the first radio system 102 may use a Motorola Smartnet™ or Smartzone™ protocol while the second radio system 104 uses a P16 or P25 protocol. At step 218, the second radio component 120 transmits the audio data and identification data to the second user radio 116 on the second talkgroup in the second radio system, thus creating interoperability between the talkgroups of the two radio systems 102, 104.

Figure 3:
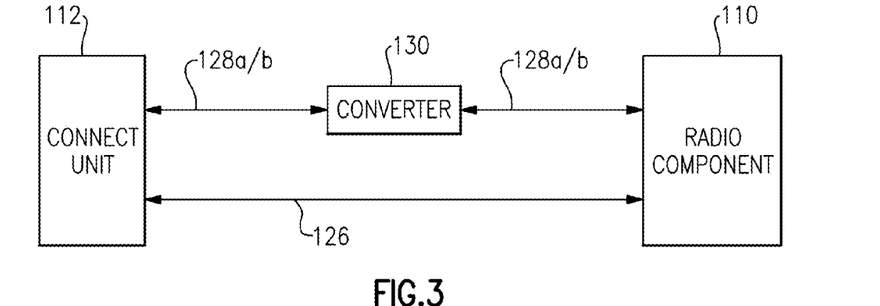
FIG. 3 is a block diagram of one example of a radio component, a converter and a connect unit according to aspects of the invention

In some embodiments, the identification data is transmitted from a radio component to the connect unit in a different format from the format the connect unit is configured to receive. Similarly, the identification data transmitted from the connect unit to a radio component may be in a different format from the format the radio component is configured to receive. Referring to FIG. 3, there is illustrated a block diagram of one example of an interface between the first radio component 110 and the connect unit 112 including a data converter 130, according to one embodiment. In this example, the radio component 110 sends audio data 126*a* directly to the connect unit 112, and similarly, the connect unit 112 sends audio data from the second radio component 120 (not shown in FIG. 3) directly to the radio component 110. In some embodiments, the radio component 110 also sends a COR signal indication directly to the connect unit 112, and the connect unit 112 sends a PTT signal directly to the radio component 110 over the same audio channel. In some embodiments, the radio component 110 sends identification data 128*a* to a data converter 130, which converts the transmission to a different format and sends the converted transmission to the connect unit 112. Similarly, in some embodiments, the connect unit 112 sends identification data 128*b* from the second radio component 120 to the data converter 130, which converts the transmission to a different format and sends the converted transmission to the radio component 110. In one example, the radio component 110 uses the RS-485 serial data format for identification data 128*a* and the connect unit uses RS-232 serial data format for the identification data 128*b*. In this example, the data converter 130 converts transmission sent from the radio component 110 from RS-485 to RS-232, and the data converter 130 converts identification data 128*b* sent from the connect unit 112 from RS-232 to RS-485.

Some radio systems, particularly those operating in large metropolitan areas may have a large number of talkgroups. Connecting multiple systems having large numbers of talkgroups with one-to-one talkgroup mappings and a separate radio component designated for each talkgroup may be burdensome or impractical. Accordingly, aspects and embodiments provide a scanning mechanism and mapping of multiple talkgroups within a pair of cross-connected radio components to reduce the number of radio components needed to cover a large number of talkgroups, as discussed further below. As discussed above, different talkgroups may be used to report different activity. For example, an emergency talkgroup may be a talkgroup that is monitored by fire, police and emergency medical response department user radios so that all three departments may respond. Another talkgroup may be used to report routine activities such as traffic stops. Thus, the emergency talkgroup may be very busy or have a high priority, while other talkgroups may be used infrequently and to communicate less urgent messages.

Accordingly, aspects and embodiments are directed to systems and methods that leverage an ability to group lesser-used talkgroups into a set and to assign one radio component to the set, rather than requiring a one-to-one mapping of every talkgroup to an individual radio component. Since many talkgroups are rarely used, and some talkgroups are rarely used simultaneously with other talkgroups, a predetermined talkgroup mapping may be designed to group selected talkgroups together on a first radio component while minimizing the likelihood of simultaneous transmissions from two different talkgroups. In one example, radio systems that are to be cross-connected are analyzed to determine which talkgroups in each system are most important and/or used most frequently and therefore should be assigned a dedicated radio component, and which are the lesser-used talkgroups that can be grouped together. A scanning radio component, discussed further below, may be used to monitor the set of talkgroups and cross-connect any talkgroup from its assigned set with a radio component or scanning radio component in another radio system to transfer transmissions from any of several talkgroups of one radio system to the other radio system.

Figure 4:
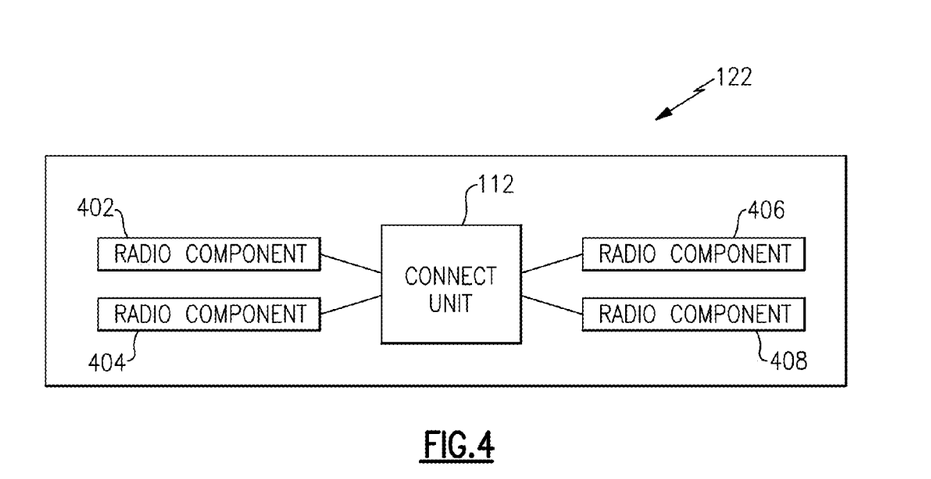
FIG. 4 is a block diagram of one example of a radio bridge system including a connect unit and multiple radio components according to aspects of the invention.

Referring to FIG. 4, there is illustrated a block diagram of a radio bridge control station 122 including multiple radio components, at least some of which are configured as scanning radio components that monitor an assigned set of talkgroups. In the illustrated example, the radio bridge control station 122 includes the connect unit 112 and first 402, second 404, third 406 and fourth 408 radio components. In one example, the first 402 and second 404 radio components are part of the first radio system 102 (and may thus correspond to first radio component 110) and the third 406 and fourth 408 radio components are part of the second radio system 104 (and may thus correspond to second radio component 120).

According to one embodiment, the first radio component 402 and third radio component 406 are each configured to monitor and to receive and transmit data in a frequently used, high priority talkgroup, such as an emergency talkgroup. Accordingly, the two radio components 402, 406 may form a first cross-connected pair based on a mapping of the first talkgroup in the first radio system 102 with the second talkgroup in the second radio system 104. This mapping is programmed into the connect unit 112, such that when the connect unit receives data from the first radio component 402, it transmits the data to the corresponding third radio component 406 which transmits the data to the second talkgroup. Similarly, when the connect unit 112 receives data from the third radio component 406 in the second talkgroup, it transmits the data to the corresponding first radio component 402 which transmits the data to the first talkgroup. Thus, the pair of radio components 402, 406 may function to create an interoperable talkgroup as discussed above with reference to FIG. 2.

Still referring to FIG. 4, according to another embodiment, the second 404 and fourth 408 radio components are configured to receive and transmit data from a set of lower-use or lower-priority talkgroups. These talkgroups share a single pair of cross-connected scanning radio components 404, 408, allowing the radio bridge control station 122 to have fewer radio components. In one example, the second and fourth radio components 404, 408 are configured to repeatedly scan their assigned talkgroups for calls on any one talkgroup of the set. If the radio component detects a call on one of its assigned talkgroups, it operates on this talkgroup to receive and transmit the call, as discussed above with reference to FIGS. 1 and 2.

In one example, the second radio component 404 is configured to receive and transmit data in multiple talkgroups of the first radio system 102. For example, the second radio component 404 may be configured to receive and transmit data in talkgroups 10-20 of the first radio system 102. Similarly, the fourth radio component 408 is configured to receive and transmit data in multiple talkgroups of the second radio system 104. For example, the fourth radio component 408 may be configured to receive and transmit data in talkgroups 25-35 of the second radio system 104. According to one example, each of the talkgroups 10-20 of the first radio system 102 correspond to one or more of the talkgroups 25-35 in the second radio system 104. The connect unit 112 may be programmed with the mapping that correlates the talkgroups in the first radio system 102 with the talkgroups in the second radio system 104. Thus, when the connect unit 112 receives data (which includes the current talkgroup number) from the second radio component 404, it determines the corresponding talkgroup number for the second radio system 104 passes the data including the corresponding talkgroup number to the fourth radio component 408 for retransmission. Similarly, the connect unit 112 may operate to map a received transmission in any of talkgroups 25-35 monitored by the fourth radio component 408 to a corresponding talkgroup assigned to the second radio component 404, such that the two radio components 404, 408 operate as a cross-connected pair. In one example, both radio components 404, 408 of the cross-connected pair operate in a scanning mode, listening for transmissions in any of their assigned talkgroups until either radio component detects a transmission. Upon detection of a transmission in an associated talkgroup, both radio components 404, 408 may stop scanning and audio and data (e.g., user identification and talkgroup number, as discussed above) may be retransmitted from one radio system to the other on the appropriate talkgroup, as discussed above.

Figure 5:
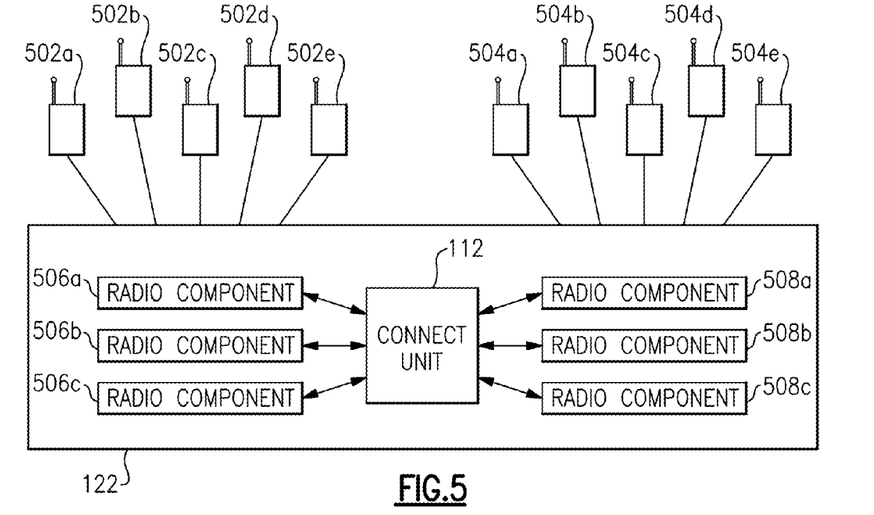
FIG. 5 is a block diagram illustrating an example of user radios in a first radio system bridged to user radios in a second radio system according to aspects of the invention.

Referring to FIG. 5, there is illustrated one example of system 500 in which two disparate radio systems 102, 104, each including multiple user radios and multiple talkgroups, are bridged using a radio bridge control station 122 such as discussed above. In the illustrated example, first user radios 502a-502e in the first radio system 102 are bridged to second user radios 504a-504e in the second radio system 104. Also in the illustrated example, the radio bridge control station 122 includes first 506a, second 506b and third 506c first radio components, the connect unit 112, and fourth 508a, fifth 508b and sixth 508c second radio components. According to one embodiment, each of the first radio components 506a-506c is configured to receive data from one or more talkgroups in the first radio system 102. Similarly, each of the second radio components 508a-508c is configured to receive data from one or more talkgroups in the second radio system 104. For example, the first radio system 102 may be the radio system for one city or municipality and the second radio system 104 may be the radio system for a neighboring city or municipality. According to one example, each radio system includes at least one talkgroup for emergency calls, and multiple other talkgroups for non-emergency calls.

According to one embodiment, the user radios 502a-502e each transmit audio data and identification data to a selected talkgroup in a first radio system. The radio components 506a-506c corresponding to the selected talkgroup (or set of talkgroups) receives the audio data, the identification data and the selected talkgroup information and sends it to the connect unit 112. The connect unit 112 uses a preprogrammed mapping to determine which talkgroup in the second radio system 104 corresponds to the selected talkgroup from the first radio system 102, processes the audio and identification data to translate it to the second radio system's protocol, and transfers the audio data, the identification data, and the talkgroup information to the second radio system via an appropriate one of the second radio components 508a-508c.

According to one example, user radios 502a and 502d send transmissions to Talkgroup 1, user radio 502b sends transmissions to Talkgroup 3, and user radios 502c and 502e send transmissions to Talkgroup 11. The first radio system's Talkgroup 1 may be the emergency call talkgroup for the first radio system, while Talkgroups 3 and 11 may be used for non-emergency communications. In this example, radio component 506a receives transmissions to Talkgroup 1; radio component 506b receives transmissions to Talkgroups 2-10; and radio component 506c receives transmissions to Talkgroups 11-20. The connect unit 112 is programmed with a mapping indicating, for example, that the first radio system's Talkgroup 1 corresponds to the second radio system's Talkgroup 5, the first radio system's Talkgroup 3 corresponds to the second radio system's Talkgroup 2, and the first radio system's Talkgroup 11 corresponds to the second radio system's Talkgroup 20, etc. As in the first radio system, the second radio system's Talkgroup 5 may be the emergency call talkgroup for the second radio system, while Talkgroups 2 and 20 may be used for non-emergency calls. The connect unit 112 uses the mapping to translate the talkgroup information into the correct corresponding talkgroup information in the second radio system. When the connect unit 112 sends the translated talkgroup information to the second radio system, the correct corresponding radio component 508a-508c receives the audio and identification data, and transmits it to the selected one or more user radios 504a-504e tuned to receive transmissions from that Talkgroup.

According to another example, the radio component 506a receives data from a first talkgroup in the first radio system 102, and the connect unit 112 processes the data and transfers it to the radio component 508a which transmits the data to a corresponding first talkgroup in the second radio system 104. According to another example, the radio component 506b receives data from Talkgroups 2-10 in the first radio system 102, and the connect unit 112 processes the data and transfers it to the radio component 508b, which transmits the data to corresponding Talkgroups 2-10 in the second radio system 104. According to another example, the radio unit 506c receives data from Talkgroups 11-20 in the first radio system 102, and the connect unit 112 processes the data and transfers it to the radio component 508c, which transmits the data to corresponding Talkgroups 11-20 in the second radio system 104. It is to be appreciated that the talkgroup numbers are illustrative only, and are not intended to be limiting. For example, Talkgroup 4 in the first radio system 102 may correspond with Talkgroup 26 in the second radio system 104.

Figure 6:
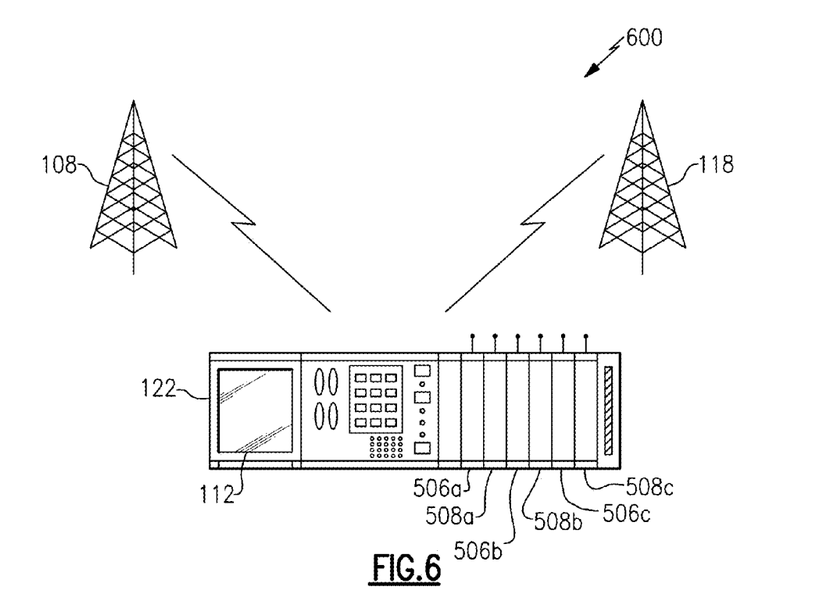
FIG. 6 is a schematic diagram of one example of a radio bridge control station including a connect unit configured to receive data from two different radio systems according to aspects of the invention.

As shown in FIG. 6 a radio bridge control station including radio components for two radio systems and a connect unit may be positioned to receive signals from both radio systems. In one example, the radio bridge control station is mounted on the dashboard of an emergency response vehicle. FIG. 6 illustrates the radio bridge control station 122 including the connect unit 112 receiving data from the first radio system 102 and the second radio system 104, according to one embodiment. The radio bridge control station 122 includes first radio components 506a-506c and second radio components 508a-508c. As discussed above, the first radio components 506a-506c receive and transmit data to and from the first radio system 102. The second radio components 508a-508c receive and transmit data to and from the second radio system 104. The radio components 508a-c are connected to the connect unit 112 which processes data from each radio system and translates it for transmission to the other radio system, as discussed above. According to one feature, this enables radio communications between two user groups using different radio systems.

Accordingly, various aspects and embodiments are directed to a system and method that configures a connect unit to transfer digital data in addition to audio signals from user radios in one radio system to user radios in another, different radio system, as discussed above. Additionally, some embodiments limit the number of radio components used to accomplish the interoperability between systems by grouping talkgroups together on individual radio components. These approaches allow existing radio systems to be modified relatively inexpensively to enable full digital and audio communication with other radio systems operating under a different protocol. Furthermore, with this capability, user groups (such as municipalities or cities) may be able to transition more easily from one type of radio system to another because users may be able to access both radio systems (and other users in both systems) throughout the transition.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of connecting a first radio system and a second radio system comprising:
receiving at a first radio component in the first radio system audio data and identification data from a first user radio transmitting in a first talkgroup of the first radio system;
transferring the audio data and the identification data from the first radio component to a connect unit;
selecting a second talkgroup in the second radio system based on a predetermined talkgroup mapping;
transferring the audio data and the identification data from the connect unit to a second radio component in the second radio system; and
transmitting the audio data and the identification data to a second user radio in the second talkgroup of the second radio system.

2. The method of claim 1, wherein the identification data includes at least one of a user identification, a talkgroup identifier, an emergency indicator and a man-down indicator.

3. The method of claim 1, wherein the first radio system uses a first radio transmission protocol and the second radio system uses a second radio transmission protocol.

4. The method of claim 3, further comprising converting the audio data and the identification data from the first radio protocol to the second radio protocol at the connect unit.

5. The method of claim 1, wherein the first talkgroup has a priority rating in the first radio system and further comprising transferring the priority rating from the first radio system to the second radio system at the connect unit.

6. The method of claim 1, further comprising holding the audio data in a buffer for a selected period of time.

7. A bridge system configured to connect a first radio system and a second radio system, comprising:
a first radio component in the first radio system configured to receive audio data and identification data from a plurality of first user radios in a plurality of first talkgroups in the first radio system;
a connect unit configured to receive the audio data and the identification data from the first radio component, identify a first talkgroup, select at least one second talkgroup in the second radio system based on a predetermined talkgroup mapping, and transfer the audio data and the identification data to the second radio system;
a second radio component in the second radio system configured to receive the audio data and the identification data and transmit the audio data and the identification data to a plurality of second user radios in the at least one second talkgroup.

8. The bridge system of claim 7, wherein the identification data includes at least one of a user identification, a talkgroup identifier, an emergency indicator and a man-down indicator.

9. The bridge system of claim 7, wherein the first radio system is configured for a first radio protocol and the second radio system is configured for a second radio protocol.

10. The bridge system of claim 9, wherein the connect unit is further configured to convert the audio data and the identification data from the first radio protocol to the second radio protocol.

11. The bridge system of claim 7, wherein each of the plurality of first talkgroups have a priority rating and wherein the connect unit is configured to receive the priority ratings and to transfer the priority ratings from the first radio system to the second radio system.

12. The bridge system of claim 7, wherein the connect unit is further configured to hold the audio data in a buffer for a selected period of time.

13. The bridge system of claim 7, wherein the at least one second talkgroup includes a plurality of second talkgroups, and wherein the predetermined mapping includes a mapping of the plurality of first talkgroups to the plurality of second talkgroups.

14. A method of connecting a user radio from a first radio system to a second radio system, the method comprising:
- receiving audio data and identification data from the user radio, the user radio associated with a first talkgroup;
- converting the audio data and the identification data from a first protocol used by the first radio system to a second protocol used by the second radio system;
- selecting a second talkgroup based on a predetermined mapping that maps the first talkgroup to a second talkgroup;
- transferring the audio data and the identification data to a radio component in the second radio system, the radio component in the second radio system associated with the second talkgroup; and
- transmitting from the radio component the audio data and the identification data.

15. The method of claim 14, wherein the identification data includes at least one of a user identification, a talkgroup identifier, an emergency indicator and a man-down indicator.

16. The method of claim 14, further comprising holding the audio data in a buffer for a selected period of time.

17. The method of claim 14, wherein the first talkgroup has a priority rating in the first radio system and further comprising transferring the priority rating from the first radio system to the second radio system at.

* * * * *